No. 813,938. PATENTED FEB. 27, 1906.
C. BAUER.
CAR FENDER.
APPLICATION FILED OCT. 12, 1905.

2 SHEETS—SHEET 1.

Witnesses
E. V. Wale.
S. Herzog

Inventor
Charles Bauer
By his Attorney
Max V. Ordmann

No. 813,938. PATENTED FEB. 27, 1906.
C. BAUER.
CAR FENDER.
APPLICATION FILED OCT. 12, 1905.

2 SHEETS—SHEET 2.

Witnesses
E. V. Wale.
S. Herzog.

Inventor
Charles Bauer
By his Attorney
Max O. Ordmann

NITED STATES PATENT OFFICE.

CHARLES BAUER, OF NEW YORK, N. Y.

CAR-FENDER.

No. 813,938. Specification of Letters Patent. Patented Feb. 27, 1906.

Application filed October 12, 1905. Serial No. 282,408.

*To all whom it may concern:*

Be it known that I, CHARLES BAUER, a native of Germany, residing at New York, in the county of New York and State of New York, have invented certain new and useful Improvements in Car-Fenders, of which the following is a specification.

The present invention pertains to fenders adapted particularly for use on street-cars and other vehicles propelled by electricity or other power, except horse-power, and has for its principal object to produce a fender which normally will be sufficiently raised from the ground and only in case of an accident, by the depression of a pedal mechanism arranged on the platform, drop onto the track, in which position it will be locked until the car is stopped and the body which may have been caught by the fender removed.

My invention has also for its object to simplify the construction, reduce its weight, and render it cheaper to manufacture, so as to adapt it to the needs and the financial resources of street-car companies.

My invention will be better understood from the accompanying drawings, in which similar reference-letters denote corresponding parts, and in which—

Figure 1:
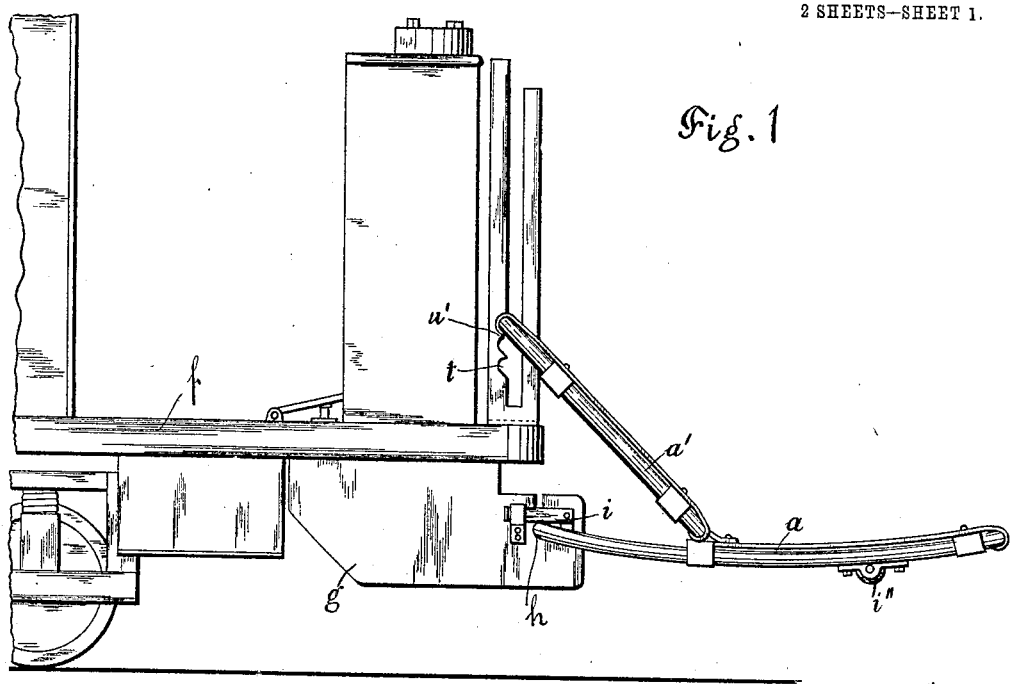
Figure 3:
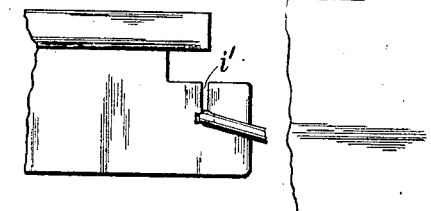
Figure 2:
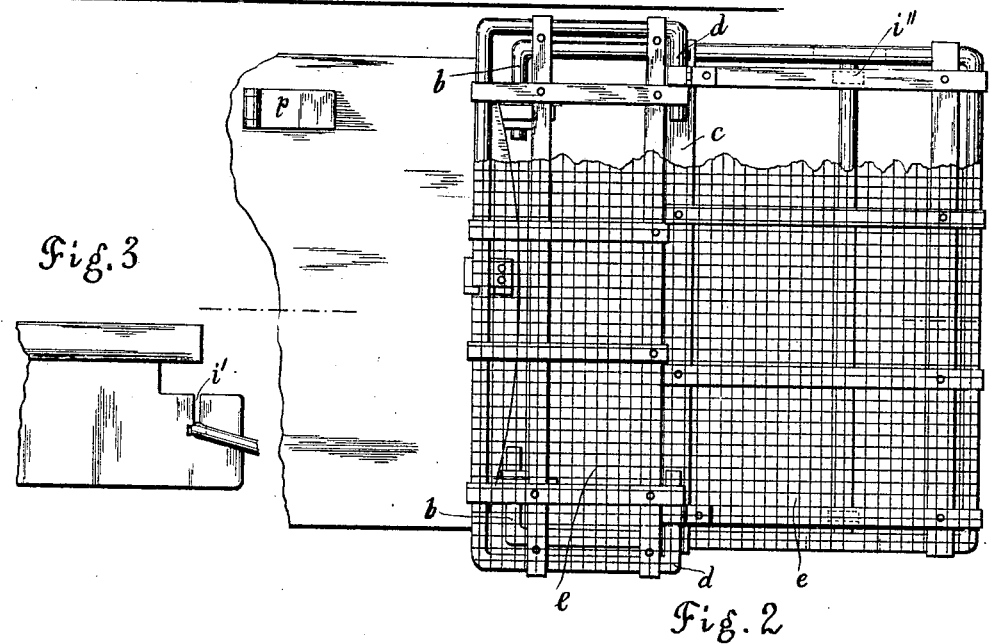
Figure 4:
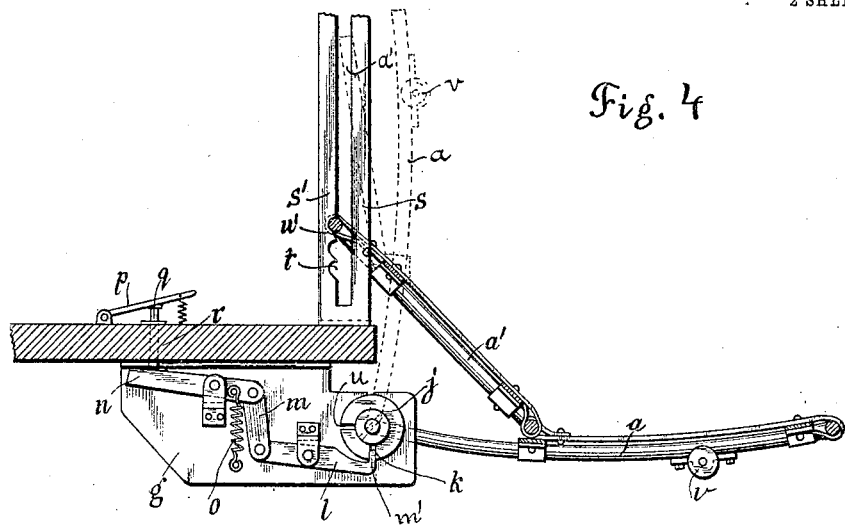
Figure 5:
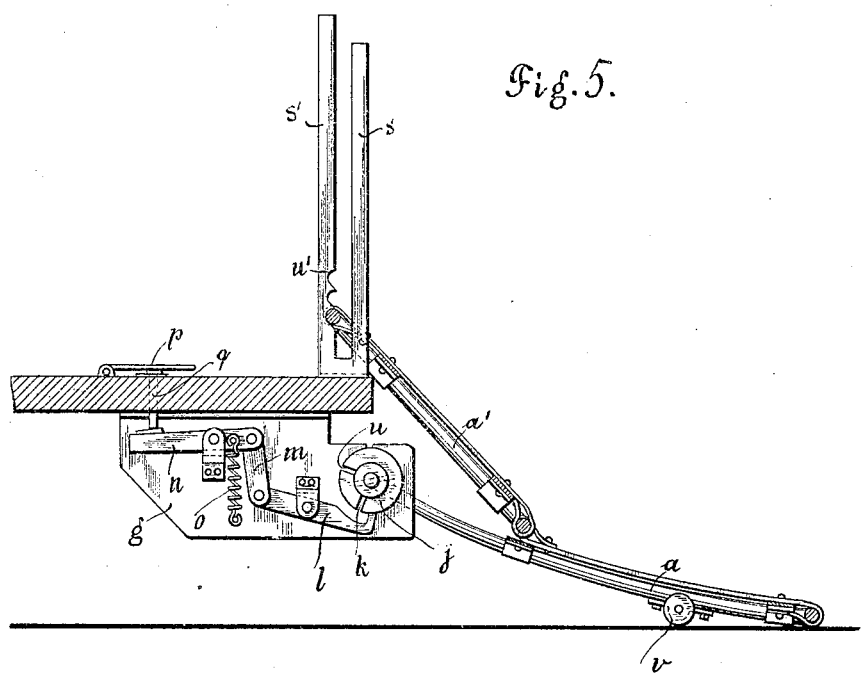

Figure 1 shows a side view of the platform of a car and of my improved fender as applied thereto, the latter being shown in raised position. Fig. 2 is a top plan of the fender. Fig. 3 is a modified form of the attachment of the fender. Fig. 4 is a vertical section through the platform of the car and the fender, showing the pedal and locking mechanism underneath the platform, the fender being in folded position; and Fig. 5 is a similar section as Fig. 4, showing the fender lowered and resting upon the track.

The improved fender consists of two frames $a$ $a'$, of which the frame $a$ serves as the fender proper and the frame $a'$ as the bumper-guard. The main frame $a$ is formed by a U-shaped bar of circular cross-section, the ends $b$ of which are bent at a right angle inward and adapted to serve as journals to support the main fender and allow a tilting thereof. At some distance from the said ends $b$ a cross-bar $c$ is attached to the sides of the U-shaped bar of the frame $a$. The second frame $a'$, which serves as the bumper-guard, is also formed of a U-shaped bar, the ends $d$ of which are directed toward the ends $b$ of the main frame $a$ and are bent at a right angle inward. These ends $d$ are suitably hinged to the cross-bar $c$, so that the bumper-guard is allowed to swing vertically upon the main frame. Both frames are provided with wire-nettings $e$ or the like.

To the under surface of the platform $f$ of the car castings $g$ are fixed, which serve as supports for the journals $b$ of the main frame $a$. For this purpose the castings $g$ are provided at their forward ends with bearings $h$, through the open tops of which the journals $b$ of the main frame $a$ can be readily slipped in. The fender will thus be removably supported from the car. Such supports are arranged at both ends of the car, so that the fender can be alternately applied to either end of the car.

To prevent an involuntary disengagement of the journals $b$ from the bearings, a locking-bar $i$ of any suitable construction may be used.

In Fig. 3 I have shown a modification in which the journals $b$ are flattened on two opposite sides, and the access $i'$ to the bearings is made correspondingly narrower than the width of the bearings. The journals $b$ can be thus slipped into the bearings when the main fender is in a certain position. When the fender is tilted, the unflattened sides of the journals will prevent the latter from jumping out from the bearings.

Normally the main fender is held in raised position from the ground. For this purpose on the inner extremity of one of the journals of the main fender $a$ a small disk or wheel $j$ is rigidly mounted, which disk is provided with a notch $k$ for the engagement of a catch $l$. The latter is fulcrumed to the corresponding casting $g$ and has at its outer end a tooth $m$, adapted to engage the said notch. The rear end of the catch $l$ is connected, by means of a lever $m$, to a double-armed lever $n$, which is also fulcrumed to the casting $g$. A spring $o$, which is attached at one end to the casting and at its other end to the outer arm of the lever $n$, causes the catch to project toward the disk or wheel $j$. When the notch of the wheel $j$ registers with the tooth of the catch $l$, the tooth will engage the same and lock the disk, and consequently the main frame in raised position.

The releasing device is formed by a pedal $p$, arranged on the platform. To the forward end of the pedal a rod $q$ is pivoted, which projects downward through an orifice $r$ in the bottom of the platform toward the rear end of the double-armed lever $n$. When the pedal $p$ is depressed, the rod $q$ presses the lever $n$ down against the tension of the spring $o$, whereby the catch $l$ is disengaged from the wheel $j$.

In order to lock the main fender in its lower position when it is dropped onto the track, the following arrangement is made: From the platform two upright rods $s$ $s'$ extend upward to a sufficient height, said rods being arranged one behind the other at a distance sufficient to allow the bar forming the bumper-guard with its rear side to pass and be guided vertically between them when the main frame is tilted from its normal or raised position into the lower position. The rear rod $s'$ is provided at its lower end with a notch $t$. The position of the notch is such that when the main fender drops onto the track the rear side of the bumper-guard $a'$ in moving vertically downward will engage the notch, and thus lock the bumper-guard, and consequently also the main fender, in its lower position.

If the car is not running or it is desired to use separate fenders for each end of the car, the fender out of use may be folded, as shown by dotted lines in Fig. 4. To lock the fender in its folded position, I provide a second notch $u$ in the disk or wheel $j$, so that the catch $l$ will engage said notch $u$ when the main fender is turned upward to cover the bumper-guard.

To increase the safety with which the main fender $a$ is retained in its normal or raised position, a second notch $u'$ may be provided in the rear rod $s'$, in which the rear side of the bumper-guard will engage when the main fender is raised.

At the bottom the main fender $a$ may be provided with small wheels or rollers $v$, which will engage the rails when the said fender is dropped onto the track.

The operation of my improved fender is as follows: Normally the main fender $a$ is in a sufficiently raised position from the ground, in which it is locked by the catch $l$ engaging with its tooth $m$ the notch $k$, while the rear side of the bumper-guard is centrally guided between the two rods $s$ $s'$, preferably engaging a notch $u'$ in the rear rod $s$. In case of an accident the driver depresses with his foot the pedal $p$, thus causing the catch $l$ to disengage the wheel $j$, in consequence of which the main fender $a$ drops instantaneously onto the track, its wheels or rollers engaging the rails. Simultaneously the bumper-guard is drawn downward and engages the notch $t$, thus locking both frames of the fender in their lower position. After the car is stopped and the body, which may have been caught by the fender $a$ is removed, the fender can be by hand returned into its normal position.

Palpably, the arrangement of various parts connected with my improved fender may be modified by those skilled in the art without departing from the spirit of my invention.

What I claim, and desire to secure by Letters Patent, is—

1. A car-fender which normally is locked in a raised position from the track and in case of an accident is dropped onto the same, comprising two frames formed of U-shaped bars covered with nettings, one of said frames forming the fender proper and being removably supported from the car and the other forming the bumper-guard being hinged to the first to swing vertically therein, the rear end of said bumper-guard being vertically guided, a catch or lock mechanism underneath the platform of the car to normally lock the fender proper in raised position from the track, a releasing mechanism on the platform to allow the release of the catch mechanism at the desired moment, substantially and for the purpose as specified.

2. A car-fender which normally is locked in a raised position from the track and in case of accident is dropped onto the same, comprising two frames formed of U-shaped bars covered with nettings, one of said frames forming the fender proper and having its ends bent inward to form journals, castings fixed to the under surface of the car, recesses in said castings, said recesses being adapted to bear the said journals and allowing the latter to be easily slipped into said bearings and removed therefrom, means to prevent an involuntary disengagement of the journals from the bearings, the other frame forming the bumper-guard and being hinged to the fender proper to swing thereon vertically, a guide for said bumper-guard, said guide extending upward from the platform, a catch or lock mechanism underneath the platform to lock the fender proper in a raised position from the track and means for releasing the said lock mechanism, substantially and for the purpose as specified.

3. The combination with a car-fender which normally is locked in a raised position from the track and in case of accident is dropped onto the same, of a guide and catch for the bumper-guard, comprising two upright rods centrally arranged behind and at a distance from each other upon the platform, the rear end of the bumper-guard being adapted to engage between the said guide-rods and to slide therein when the fender proper is turned from one position into the other, notches at the lower end of the rear rod, said notches being adapted to engage and lock the bumper-guard when the main fender is dropped onto the track, and hold the latter in close contact therewith, substantially and for the purpose as specified.

In testimony whereof I affix my signature in presence of two witnesses.

CHARLES BAUER

Witnesses:
MAX D. ORDMANN,
JOHN T. CARMODY.